July 15, 1958  W. B. DE GROFF  2,843,092
PRESSURE FLUID OPERATED VALVE STRUCTURE
Filed Dec. 20, 1954  2 Sheets-Sheet 1
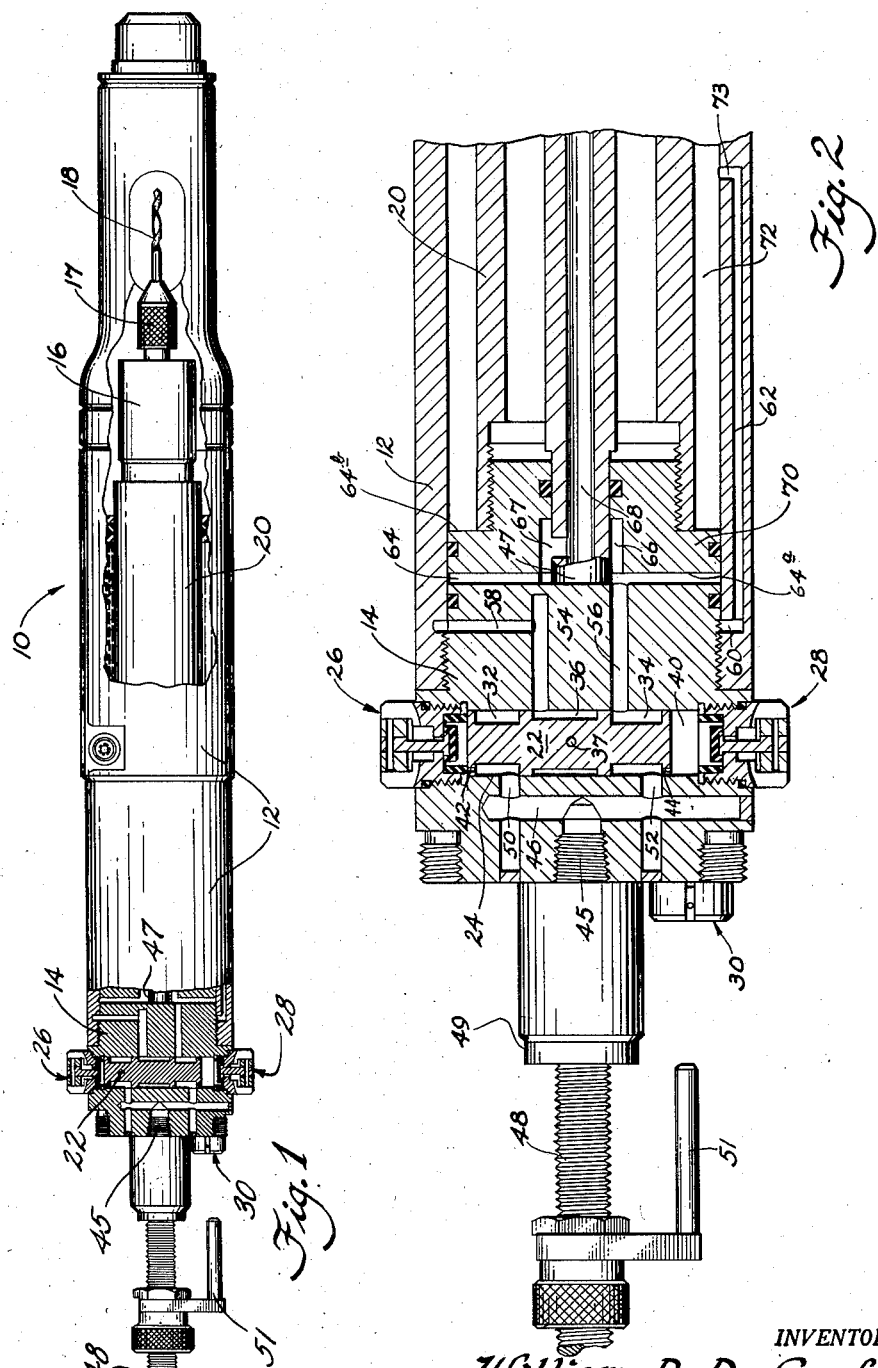
INVENTOR.
William B. De Groff
by Bair, Freeman &
Molinare Attys.

July 15, 1958 W. B. DE GROFF 2,843,092
PRESSURE FLUID OPERATED VALVE STRUCTURE
Filed Dec. 20, 1954 2 Sheets-Sheet 2
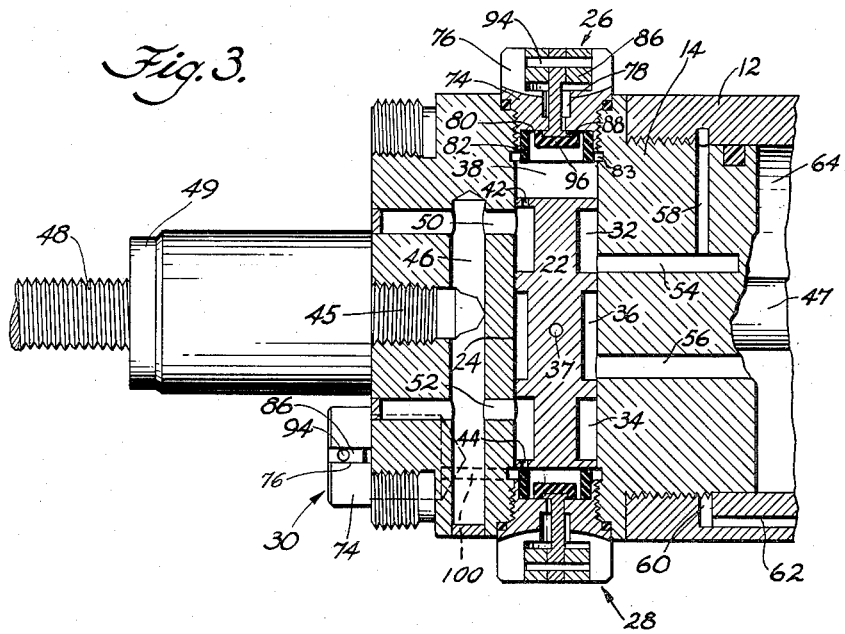
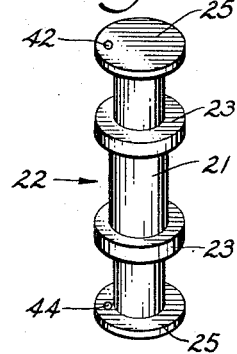
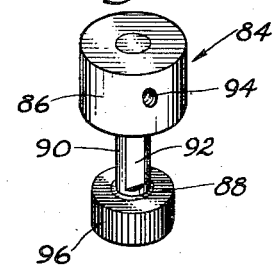
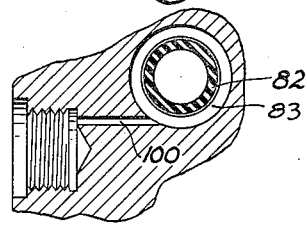
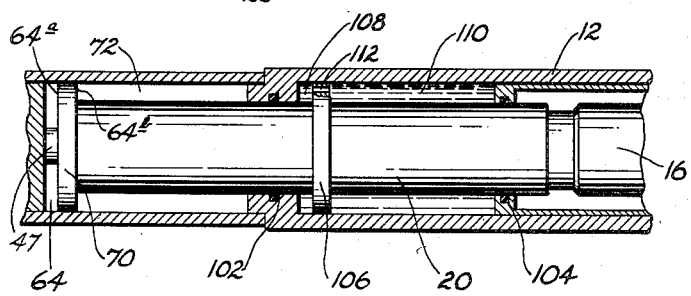
INVENTOR.
William B. De Groff
by Bair, Freeman &
Molinare Attys.

United States Patent Office 2,843,092
Patented July 15, 1958

2,843,092

PRESSURE FLUID OPERATED VALVE STRUCTURE

William B. De Groff, Bryan, Ohio, assignor to Aro Equipment Corporation, Bryan, Ohio, a corporation of Ohio Application December 20, 1954, Serial No. 476,317

2 Claims. (Cl. 121—45)

This invention relates generally to a pressure fluid operated valve structure, and more particularly to a control valve construction for an air operated drilling tool.

It is a primary object of this invention to provide a control valve for selectively regulating a flow of compressed air to either side of a double acting piston so as to feed a drilling tool in forward and reverse directions as desired.

It is another object of this invention to provide a control valve for an air operated drilling tool which will selectively feed compressed air for forward and reverse movement of the drilling tool, and which will direct air to an air motor for operatively driving the tool, such air feed to the motor being only provided when the drilling tool is being moved forwardly.

It is a further object of this invention to provide a control valve for an air operated drilling tool having forward and reverse manual actuating buttons, and a reverse automatic actuating button.

It is still another object of this invention to provide a control valve for regulating the flow of a pressure fluid which includes a reciprocable spool valve and control means for unbalancing the pressure fluid forces on the valve so as to effect a shifting movement thereof for selectively opening and closing a plurality of flow ports, whereby the pressure fluid may be directed to an air motor for driving the drilling tool and to a feeding means for selectively moving the drilling tool in forward and reverse directions.

With these and other objects in view, my invention consists in the construction, arrangement and combination of the various parts of my pressure fluid operated valve structure whereby the objects contemplated are obtained as hereinafter more fully set forth, pointed out in my claims and illustrated in the accompanying drawing, wherein:

Figure 1 is a side elevational view of a pressure fluid operated drill embodying the valve structure of the present invention, partly broken away and in section to show details of construction;

Figure 2 is a cross-sectional view of the left hand end of Figure 1 on an enlarged scale, showing constructional details of the valve of the present invention in a position of adjustment for power drive of the drill motor and forward movement of the drilling tool;

Figure 3 is another cross-sectional view similar to Figure 2, showing the valve in a position of adjustment for reverse movement of the drilling tool;

Figure 4 is a perspective view of the spool valve member embodied in the present valve construction;

Figure 5 is a perspective view of the actuator button embodied in the control means of the present valve construction;

Figure 6 is a fragmentary cross-sectional view, taken substantially as indicated at line 6—6 on Figure 3, showing the intercommunicating venting conduit between the automatic and manual reverse control means;

Figure 7 is a fragmentary view, on a greatly enlarged scale, of a portion of Figure 3, showing the cooperative relation between structural portions of the manual and automatic reverse control means and the spool valve; and Figure 8 is a fragmentary cross-sectional view in side elevation, substantially on the same scale as Figure 1, showing the double acting air piston which effects forward and reverse shifting of the drilling tool.

Referring now to the drawing, I have shown a portable compressed air feed drill, indicated generally at 10. The drill comprises an outer casing 12, having a valve housing 14 at its one end. The casing 12 encloses a vane-type air motor 16 having a chuck 17 and a drill bit or tool 18 operatively connected thereto. The motor 16 is carried by the forward end of a double acting air piston 20.

As best seen in Figures 2 and 3 of the drawing, I provide a spool valve 22 slidably disposed within a cylindrical bore 24 formed in the valve housing 14. A forward control means 26 and a reverse control means 28 are screw-threadedly received within the housing 14 at opposite ends of the bore 24. The controls 26 and 28 are manually operated in a manner to be hereinafter described in detail. In addition, I also provide an auxiliary reverse control 30, adjacent the manual control 28 and in operative communication therewith. The control 30 is automatically operated in a manner to be described.

The spool valve member 22 (as seen in Figure 4) comprises a cylindrical rod 21 having a pair of spaced annular flanges 23 extending radially outwardly therefrom. The flanges 23 are positioned intermediate the length of the rod 21 in spaced relation to a pair of terminal end flanges 25. The flanges 23 and 25 are formed so as to contactingly engage the inner wall portions of the bore 24 to permit the valve 22 to be slidably shifted therein. The valve 22 is of shorter length than the length of the bore between the controls 26 and 28 so as to provide a shifting distance through which the valve may be moved.

It will be apparent that when the valve 22 is positioned within the bore 24 the flanges 23 and 25 will serve to form a plurality of non-communicating annular valve chambers. These chambers include a forward end valve chamber 34, a reverse end valve chamber 32, and an exhaust intermediate valve chamber 36. An exhaust passage 37 serves to communicate the intermediate chamber 36 with atmosphere. A forward end housing chamber 40 (see Figure 2) is formed by the one end 25 of the valve 22 and portions of the control 28. A reverse end housing chamber 38 (see Figure 3) is formed between the other end 25 of the valve 22 and portions of the control 26.

Bleed passages 42 and 44 extend axially through the terminal end flanges 25 of spool valve 22 at points closely adjacent the outer peripheral edges thereof. These bleed passages provide restricted flow communication between the end housing chambers 38 and 40 and the forward and reverse end valve chambers 32 and 34, respectively.

A compressed air inlet fitting 45 is formed in the housing 14. The fitting 45 is adapted to receive a cooperating connector fitting for attachment of a compressed air supply feed line (not shown) to the housing 14. An inlet conduit 46 communicates with the fitting 45 and extends transversely across the housing 14.

A pair of inlet passages 50 and 52, spaced from each other at opposite ends of the inlet conduit 46, communicate with the forward end valve chamber 34 and the reverse end valve chamber 32, respectively. In this manner, compressed air will be admitted to the opposed end valve chambers 34 and 32.

A pair of spaced outlet passages 54 and 56 are formed within the housing 14 and communicate with the valve bore 24. A cross passage 58 communicates with the outlet passage 54 and terminates in an annular housing passage 60. The passage 60 communicates with a reverse-flow feed conduit 62 formed in the casing 12.

The outlet passage 56 terminates at its end opposite to the valve bore 24 in an annular piston space 64. The space 64 is defined by the end wall of the housing 14, the inner wall of the casing 12 and a first acting surface 64a of a head portion 70 of the double acting air piston 20. A second acting surface 64b is provided the side of the head 70 opposite to the face 64a.

A shaft 47 extends outwardly through the housing 14. The shaft 47 is screw-threaded at its outer terminal end 48 for cooperation with adjustable stop means 49, which serves to limit axial movement of the shaft 47 in a left hand direction beyond the position shown in Figure 2. The stop means 49 is provided internally with flats adapted to engage similar flats formed on the shaft end portion 48. The details of such means are conventional and well known, and form no part of the present invention. An automatic reverse control actuator 51 is carried by the shaft end 48, and operatively engages the control 30 to actuate the same when the shaft 47 is shifted forwardly a sufficient distance.

The piston head 70 of the air piston 20 is formed with an annular space 66 adjacent the shaft 47. The space 66 communicates through a cross passage 67 to a longitudinally extending feed conduit 68 formed within the shaft 47. The conduit 68 communicates with the air motor 16, and serves to deliver a flow of compressed air for operatively driving the motor. The piston head 70 is axially slidable within the casing 12, and upon movement serves to reciprocate the piston 20, as well as the motor and drill carried thereby, within the casing 12.

An annular space 72 is provided between the piston 20 and the casing 12. A passage 73 communicates the conduit 62 with the space 72 so as to permit the delivery of compressed air to the other acting face 64b of the piston head 70.

It will be apparent that by feeding air to one face or the other of the piston head 70, the piston 20 may be reciprocated within the casing 12 so as to effect a forward or reverse movement of the air motor and the drilling tool. It will also be apparent that admission of air to the face 64a of the piston head 70, for moving the piston 20 forwardly, will also serve to admit air to the conduit 68 for driving the air motor 16.

Each of the control means 26, 28 and 30 (see Figure 3) comprises a retaining nut 74 screw-threaded into the housing 14. Each nut 74 is formed with a transverse slot 76, and an axial bore 78 terminating in a cup-shaped end 80. An annular sealing member 82 of resilient material such as rubber or the like is disposed within the cup-shaped end 80, spaced radially inwardly of a narrow annular enlargement 83 at the end of bore 24. The sealing members 82 of each of the manual controls 26 and 28 cooperate with the end flanges 25 of the valve 22 so as to effect a closing of the bleed passages 42 and 44 when in contacting engagement therewith, as best seen in Figure 7.

A plug or actuator button 84 is received within the retaining nut 74. As shown in Figure 5, the plug 84 has enlarged upper and lower ends 86 and 88 connected by shaft 90. A flat 92 is provided at one side of the shaft 90. A cross passage 94 extends across the end 86 and communicates at its open ends with the transverse slot 76. A resilient valve cap 96 is positioned around the lower end 88 of plug 84. The cap 96 normally engages the adjacent bottom wall of the cup-shaped end 80 of the nut 74 to effect a closure and preclude air flow through the passage formed between flat 92 and bore 78. The cap 96 will be biased closed by air pressure (greater than atmospheric) within the adjacent end housing chamber.

The manual control 28 and the automatic control 30 are intercommunicated by a venting conduit 100 (see Figure 6). As will appear hereinafter, actuation of either of the controls 28 and 30 will serve to vent the reverse end housing chamber 38.

As seen in Figure 8 of the drawing, the piston 20 is slidably supported within the casing 12 by means of the head 70 and annular barriers 102 and 104. An annular flange member 106 is carried by the piston 20 intermediate its ends. The outer peripheral portion of the flange 106 contactingly engages and slides along the inner wall of the casing 12 as the piston 20 is reciprocated therein. The flange 106 cooperates with the casing 12 and the barriers 102 and 104 to form chambers 108 and 110. The chambers 108 and 110 are sealed with a hydraulic fluid, such as oil. A bleed passage 112 provides communication between the oil chambers 108 and 110. It will be apparent that upon reciprocation of the piston 20 by air pressure on one or the other of the acting surfaces 64a and 64b of the piston head 70, the flange 106 will cooperate with the chambers 108 and 110 to serve as a dash-pot to regulate the shifting movement of the piston 20. Although not disclosed herein, and not a part of the present invention, it will be obvious that the bleed passage 112 may be provided with a suitable one-way valve and a cooperating by-pass passage around the flange 106 so as to permit variable regulation of the speed of movement of the piston 20 in an obvious manner.

*Operation*

In the practical operation of a portable compressed air feed drill of the type disclosed, incorporating the control valve construction of the present invention, a supply of compressed air will be provided to the valve housing 14 at the inlet fitting 45. In Figure 2 of the drawing I have shown the double acting piston 20 in its position of maximum rearward movement. In such position, the annular space 64 is of minimum volume as determined by the stop means 49, which limits the rearward shifting movement of the shaft 47.

Upon manual pressure, the actuator button or plug 84 of the control means 26 will be depressed against the air pressure biasing force within end housing chamber 38 so as to unseat the valve cap 96 from the bottom wall portion of the cup-shaped terminal end 80 of the retaining nut 74. In this way, flow communication will be provided from the end housing chamber 38, through the passage formed by the flat 92 and the axial bore 78, past the transverse slot space 76, to atmosphere. Since the reverse control means 28 and 30 are not actuated, and end housing chamber 40 is not in communication with atmosphere, an unbalanced force will be exerted by the incoming compressed air upon the spool valve 22 so as to cause it to shift within the bore 24 to the position shown in Figure 2 of the drawing.

When in this position, the incoming compressed air will flow from the inlet conduit 46 through the inlet passage 52, the forward valve end chamber 34, and the outlet passage 56 to the annular piston space 64. This flow of compressed air will exert a pressure force upon the acting surface 64a of the piston head 70, and will effect a shifting movement of the piston 20 from its most rearward position, as shown, forwardly along the casing 12. At the same time the compressed air in annular space 64 will flow through the annular passage 66, cross passage 67, and conduit 68 to the motor 16. In this way the motor will simultaneously be driven as it is shifted forwardly by the piston 20.

The extent of forward movement of the drilling tool may be predetermined by adjustment of the automatic reverse control actuator 51 to a desired position along the screw-threaded shaft end 48, so that the actuator 51 will engage the button 84 of the automatic control means 30 when the drill has reached the desired position of forward movement. Alternatively, the manual control means 28 may be actuated by the operator as desired to terminate forward movement of the motor and drilling tool, and to initiate reverse movement thereof.

Actuation of the manual reverse control means 28 will serve to vent the end housing chamber 40 in the manner described above with respect to end housing chamber 38. Such venting will serve to unbalance the pressure force upon the spool valve 22, and will cause a shifting thereof from the position of Figure 2 to that shown in Figure 3. Similarly, of course, automatic actuation of control 30 will serve to vent the end housing chamber 40 through the venting conduit 100 and portions of the control means 30. When the spool valve 22 is in the position shown in Figure 3, the flow of compressed air delivered at fitting 45 will be as follows. Air will pass through inlet conduit 46, inlet passage 50, reverse end valve chamber 32, outlet passage 54, cross passage 58, annular passage 60, casing conduit 62, cross passage 73, and annular space 72, to the second acting surface 64b of the piston head 70. In this way, the incoming compressed air will be directed to the reverse face of the piston so as to effect a rearward shifting of the piston 20 from a forward position to a rearwardly withdrawn position.

In Figure 2, the valve member 22 has been shown shifted to its position for forward drill actuation as a result of an immediately previous depressing of the forward control means 26, which served to relieve pressure from the housing chamber 38 and vent it to atmosphere. In order to fully understand the action by which valve shifting occurs, the following conditions accompanying the valve position of Figure 2 must be pointed out. Operating pressure in the housing chamber 40 is exerted against the adjacent end of the spool valve 22, biasing the valve to its upper position, as shown. The pressure is delivered to the chamber 40 through the bleed passage 44. The opposite end of the spool valve bears against the resilient sealing member 82 of the control means 26, causing the sealing member 82 to resiliently deform slightly and effect a closure of the bleed passage 42. In this way, the area of the valve N in contact with the sealing member 82 of control 26 is ineffective for response to any air pressure which may exist from being trapped in the volume portion of the chamber 38 now confined within the annular sealing member 82. Air may or may not be so trapped, and operation of the valve will be the same in either event. If air is trapped, the reduction of the exposed area of the spool valve end against which captured air pressure may exert a force results in an imbalance favoring a greater total force and consequent bias provided by the operating pressure within the housing chamber 40. When operating pressure is ported to the valve chamber 32, the pressure will be transmitted to the bleed passage 42. The pressure within cavity 32, however, is ineffective in valve operation since the areas to which it is applied balance in opposing directions of valve movement. Exhaust air in the valve chamber 36 will be vented to atmosphere through the passage 37 and no pressures within this chamber can affect the valve response.

In order to effect shifting of the spool valve 22 to its position as shown in Figure 3 of the drawing for reverse actuation of the drill, controls 28 or 30 are depressed, manually or automatically respectively, and the operating pressure within the housing chamber 40 will be vented to atmosphere. The pressure biasing force tending to maintain the spool valve 22 in its upper position as shown in Figure 2 will then be eliminated. The resilient sealing member 82 of control 26, against which the upper end of spool valve 22 is seated in Figure 3, is no longer subjected to a deforming force and tends to regain its natural free dimensions in accordance with the inherent resilient properties of the rubber material or the like of which it is made. This relaxed condition of the said sealing member 82 no longer provides an adequate sealing closure for the bleed passage 42 and local yielding of the rubber sealing member permits a leakage of air from the enclosed volume of housing chamber 38 within the annular sealing member 82 across the annular end of the member 82 to the annular portion 83 of the chamber 38 radially outwardly thereof. This leakage of captured air is sufficient to exert a pressure force across the adjacent end of the spool valve 22 and move the valve slightly away from the sealing member 82. This movement permits a free passage of operating air through the now opened bleed passage 42 into the chamber 38, thereby enlarging the volume of the chamber 38 as the spool valve 22 is driven downwardly toward its position of Figure 3. This leakage action and slight movement of the spool valve end away from its previous sealing engagement with member 82 also serves to expose the full area of the valve end, including the annular portion previously rendered ineffective by contact with the sealing member 82, thereby gaining full utilization of the line pressure for maximum biasing force and movement of the spool valve 22 from its position of Figure 2 to its position of Figure 3.

When the valve is in its position of Figure 3, the same pressure conditions exist at the end of the spool valve adjacent controls 28 and 30 as were previously described in connection with the opposite end of the spool valve adjacent control 26. The same sequence of operations occurs in substantially the same manner for movement of the spool valve from its position of Figure 3 to its position of Figure 2.

It should be apparent that selective actuation of the forward and reverse control means will serve to effect corresponding unbalancing of the pressure forces on the spool valve, thereby effecting a shifting thereof to open and close appropriate flow ports for directing compressed air to drive the drill motor and to shift the drilling bit forwardly and rearwardly within the drill casing.

Changes may be made in the construction and arrangement of the parts of my pressure fluid operated valve structure without departing from the real spirit and purpose of my invention, and it is my intention to cover by my claims any modified forms of structure or use of mechanical improvements which may be reasonably included within their scope.

What I claim as new and desire to obtain by Letters Patent of the United States is:

1. In a control device for regulating the flow of a pressure fluid, a housing, a spool valve reciprocably movable within a bore formed in said housing for performing a valving function, said spool valve comprising a rod member, having flanges formed at the opposite ends thereof, each of said flanges cooperating with the walls of said housing bore to define a regulating chamber at the inner side thereof and a venting chamber at the outer side thereof, said flanges each having a bleed passage extending therethrough to provide flow communication between each of said regulating chambers and the adjacent venting chambers, inlet means for supplying a flow of pressure fluid to said regulating chambers, a pair of independently operable valve-actuating controls serving to permit selective venting of said venting chambers, said bleed passages being restricted in size to permit said venting chambers to be vented at a flow rate substantially greater than the flow rate of pressure fluid from the regulating chambers through said bleed passages to the venting chambers, whereby the pressure forces exerted on said spool valve by said pressure fluid may be selectively unbalanced to effect alternative movements of said valve toward a vented end for performing a valving function, and resilient sealing means disposed within each of said venting chambers and positioned to abut the corresponding adjacent valve flange to close off the bleed passage therein when said spool valve is shifted to a limiting position of engagement with said sealing means.

2. In a control device for regulating the flow of a presssure fluid, a housing, a spool valve reciprocably movable within a bore formed in said housing for performing a valving function, said spool valve comprising a rod member, having flanges formed at the opposite ends thereof, each of said flanges cooperating with the walls of said housing bore to define a regulating chamber at the inner side thereof and a venting chamber at the outer side thereof, said flanges each having a bleed passage extending therethrough to provide flow communication between each of said regulating chambers and the adjacent venting chambers, inlet means for supplying a flow of pressure fluid to said regulating chambers, three independently operable valve-actuating controls for selective venting of said venting chambers, two of said controls independently serving to vent one of said venting chambers and the other control serving to vent the other of said venting chambers, one of said two controls being remotely positioned relative to a corresponding venting chamber in communicating therewith by means of an elongated conduit, said bleed passages being restricted in size to permit said venting chambers to be vented at a flow rate substantially greater than the flow rate of pressure fluid from the regulating chambers through said bleed passages to the venting chambers, whereby the pressure forces exerted on said spool valve by said pressure fluid may be selectively unbalanced to effect alternative movements of said valve toward a vented end for performing a valving function, and resilient sealing means disposed within each of said venting chambers and positioned to abut the corresponding adjacent valve flange to close off the bleed passage therein when said spool valve is shifted to a limiting position of engagement with said sealing means.

References Cited in the file of this patent

UNITED STATES PATENTS

| | | |
|---|---|---|
| 2,607,197 | Johnson | Aug. 19, 1952 |
| 2,616,449 | Maha | Nov. 4, 1952 |